UNITED STATES PATENT OFFICE.

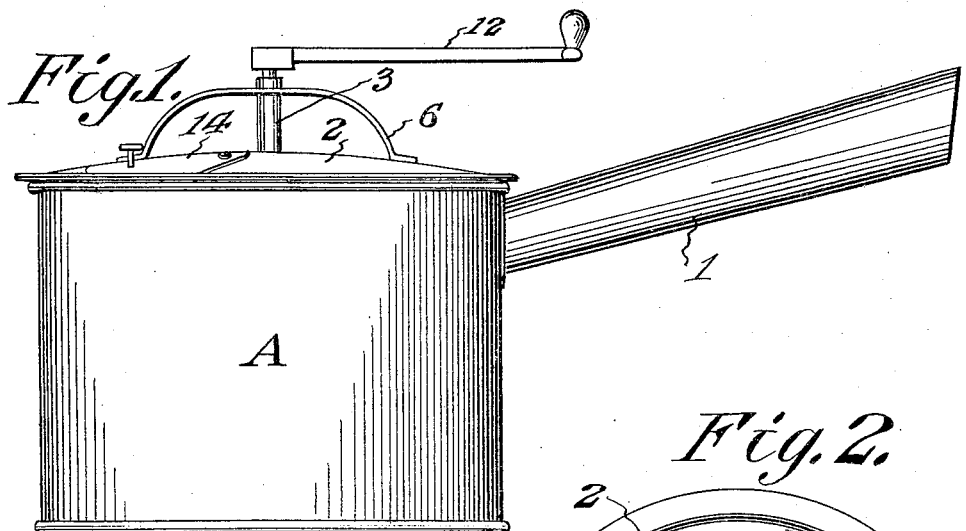
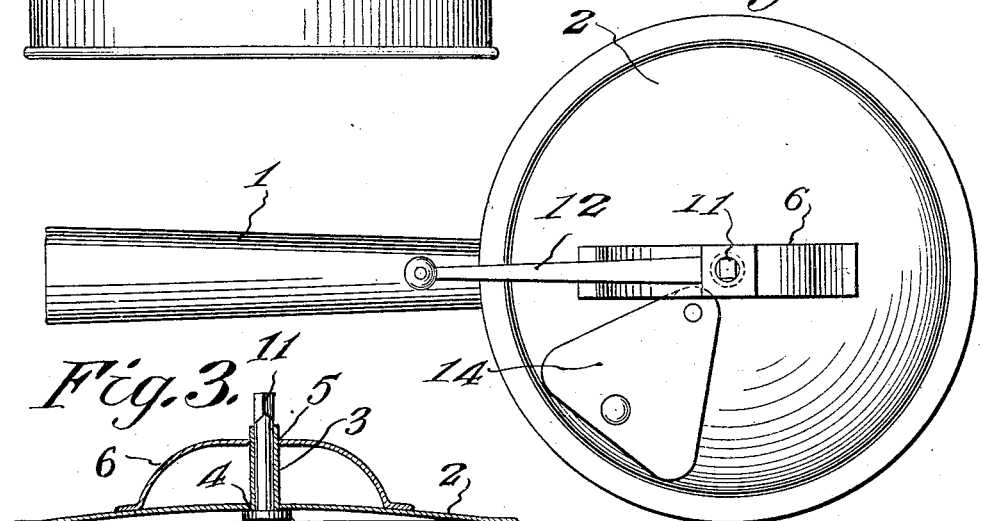
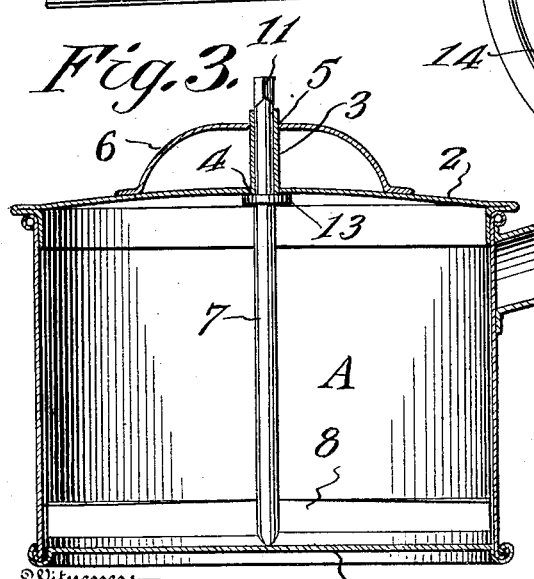
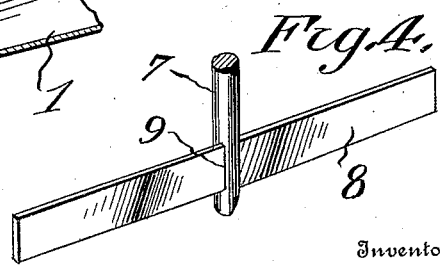

ALFRED LANDRY, OF DONALDSONVILLE, LOUISIANA.

COFFEE-ROASTER.

No. 912,136.　　　Specification of Letters Patent.　　　Patented Feb. 9, 1909.

Application filed April 11, 1908. Serial No. 426,542.

*To all whom it may concern:*

Be it known that I, ALFRED LANDRY, a citizen of the United States, residing at Donaldsonville, in the parish of Ascension and State of Louisiana, have invented new and useful Improvements in Coffee-Roasters, of which the following is a specification.

This invention relates to a coffee roaster which is designed to permit the coffee to be roasted in a closed receptacle so that the strength and aroma is not lost, there being an agitator within the receptacle to insure the even roasting of coffee grains.

The invention has for one of its objects to improve and simplify the construction and operation of devices of this character so as to be comparatively easy and inexpensive to manufacture, and thoroughly reliable and efficient in use.

A further object of the invention is the provision of a coffee roaster consisting of a receptacle and a lid therefor, with an agitator mounted on the lid whereby the coffee can be uniformly roasted without the strength and aroma being lost, the lid having a covered opening through which the attendant can from time to time ascertain the condition of the grains of coffee in the receptacle.

With these objects in view and others, as will appear as the description proceeds, the invention comprises the various novel features of construction and arrangement of parts which will be more fully described hereinafter and set forth with particularity in the claim appended hereto.

In the accompanying drawing, which illustrates one of the embodiments of the invention, Figure 1 is a side elevation of the coffee roaster. Fig. 2 is a plan view thereof. Fig. 3 is a central vertical section of the roaster. Fig. 4 is a perspective view of the agitator.

Similar reference characters are employed to designate corresponding parts throughout the several views.

Referring to the drawing, A designates a receptacle which is of any suitable construction and provided with a handle 1. The cover 2 tightly fits in the receptacle so as to provide an approximately air-tight holder for the coffee. On the cover is a vertical sleeve 3 which is secured at its lower end in an opening 4 of the cover and at its upper end in an opening 5 of a handle 6, the handle serving as a bracing means to hold the sleeve rigidly in place. Rotatably mounted in the sleeve is a shaft 7 on which is an agitator 8, the agitator consisting of a strip inserted through a slot 9 in the lower end of the shaft. The bottom end of the shaft rests on the bottom 10 of the receptacle and the upper end projects out of the sleeve 4 and is squared, as at 11, to receive an operating crank 12. On the shaft is a collar 13 which bears against the under surface of the cover at the lower end of the sleeve to prevent upward movement of the shaft when the coffee roaster is in operation, and serving to close the lower end of the sleeve to make the roaster air-tight. On the cover is a pivoted door 14 which can be opened to permit the coffee to be inspected from time to time to see if the roasting operation is finished.

In using the roaster, the cover is removed and the desired quantity of coffee placed therein, after which the cover is replaced with the agitator. The head is then applied to the roaster and the agitator operated by means of the crank so as to stir the coffee and cause a uniform roasting thereof. As the roasting operation proceeds, the condition of the coffee can be ascertained by opening the door 14 to uncover the peep hole. After the coffee is roasted, the lid is taken off, together with the agitator, and the coffee poured out into the proper receptacle.

A roaster of this character is not necessarily limited to coffee roasting purposes, but the agitator can be removed from the cover by taking off the crank handle and pulling the shaft out of the sleeve 3, and the vessel can be used for cooking purposes, if desired.

It will be noted that the coffee roaster is practically smoke and vapor-tight, so that during the roasting operation, the smoke and steam from the coffee will be prevented from escaping into the air, thereby overcoming a great objection in the process of coffee roasting, wherein open roasters or pots are employed, this latter method being objectionalable in that the smoke rising from the coffee not only permeates the entire building but is exceedingly disagreeable to the operator.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim.

Having thus described the invention, what I claim is:—

A coffee roaster comprising a receptacle, a handle therein, a removable cover fitting the receptacle and having an aperture, a sleeve fitted in the aperture and rising from the cover, a handle secured to the cover and provided with an aperture for receiving the sleeve and forming a brace for the latter, a shaft rotatably mounted in the sleeve, a transversely-extending strip carried by the shaft and forming an agitator disposed at the bottom of the receptacle, a collar on the shaft disposed in contact with the bottom of the cover to form a closure for the lower end of the sleeve, a crank secured on the upper end of the shaft and coöperating with the collar to prevent longitudinal movement of the shaft in the sleeve, and a door on the cover.

In testimony whereof I affix my signature in presence of two witnesses.

ALFRED LANDRY.

Witnesses:
ADAM HEBERT,
G. A. BLANCHARD.